Sept. 21, 1937.  F. L. G. STRAUBEL  2,093,941
CARD INDEX PANEL AND CARD CARRIER COMBINATION
Filed Sept. 1, 1936  5 Sheets-Sheet 1
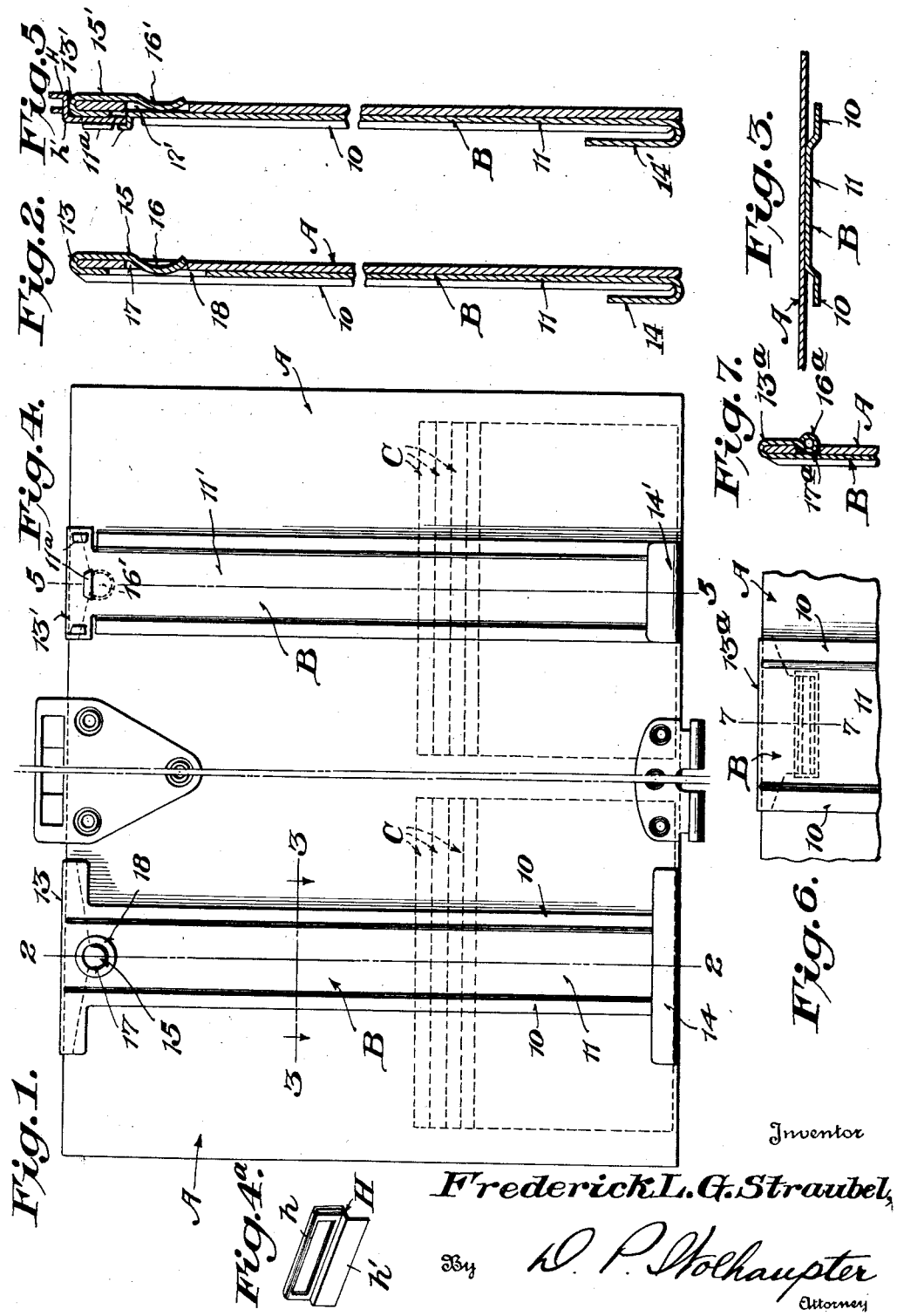
Inventor
Frederick L. G. Straubel,
By D. P. Wolhaupter
Attorney

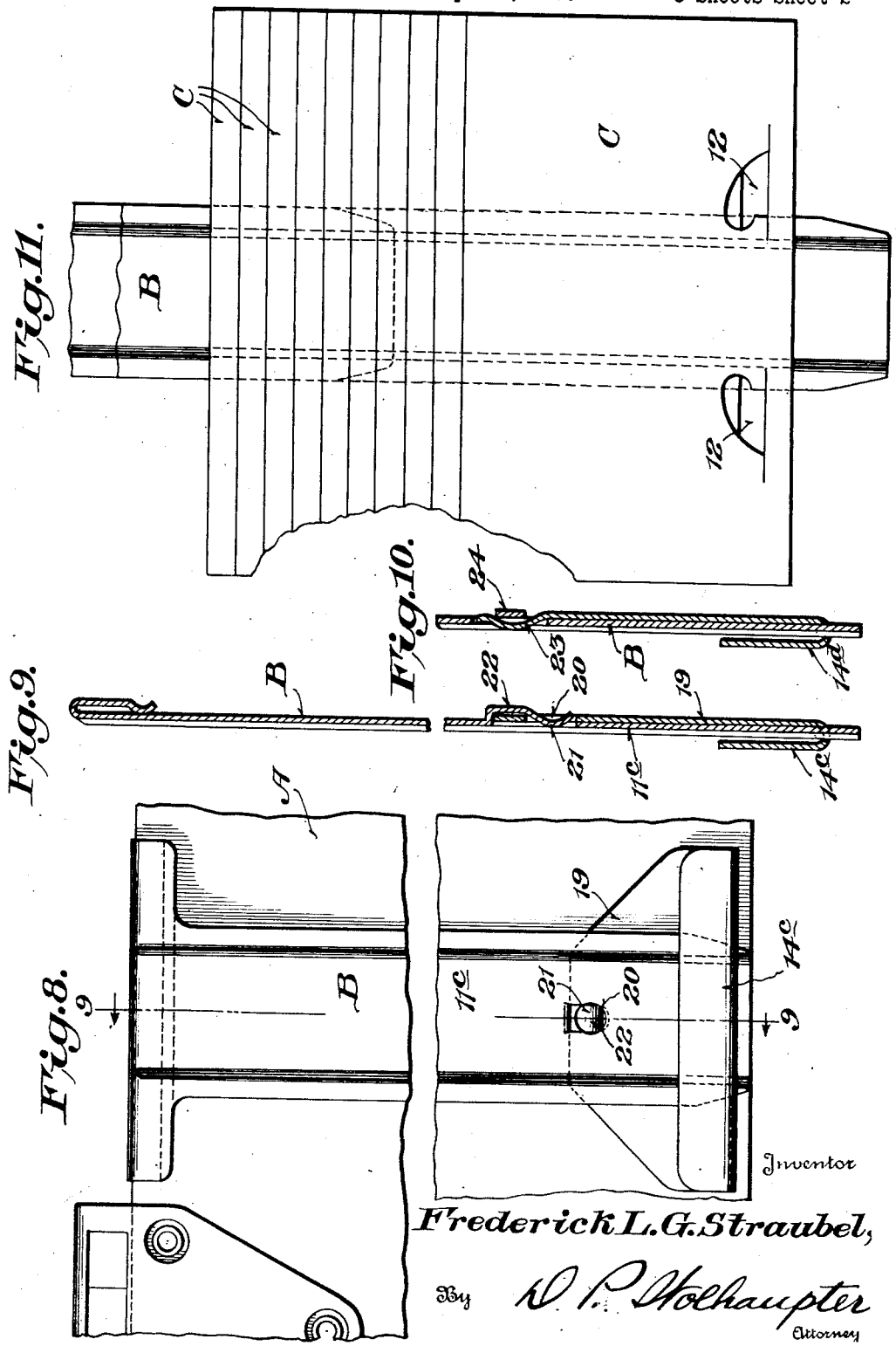

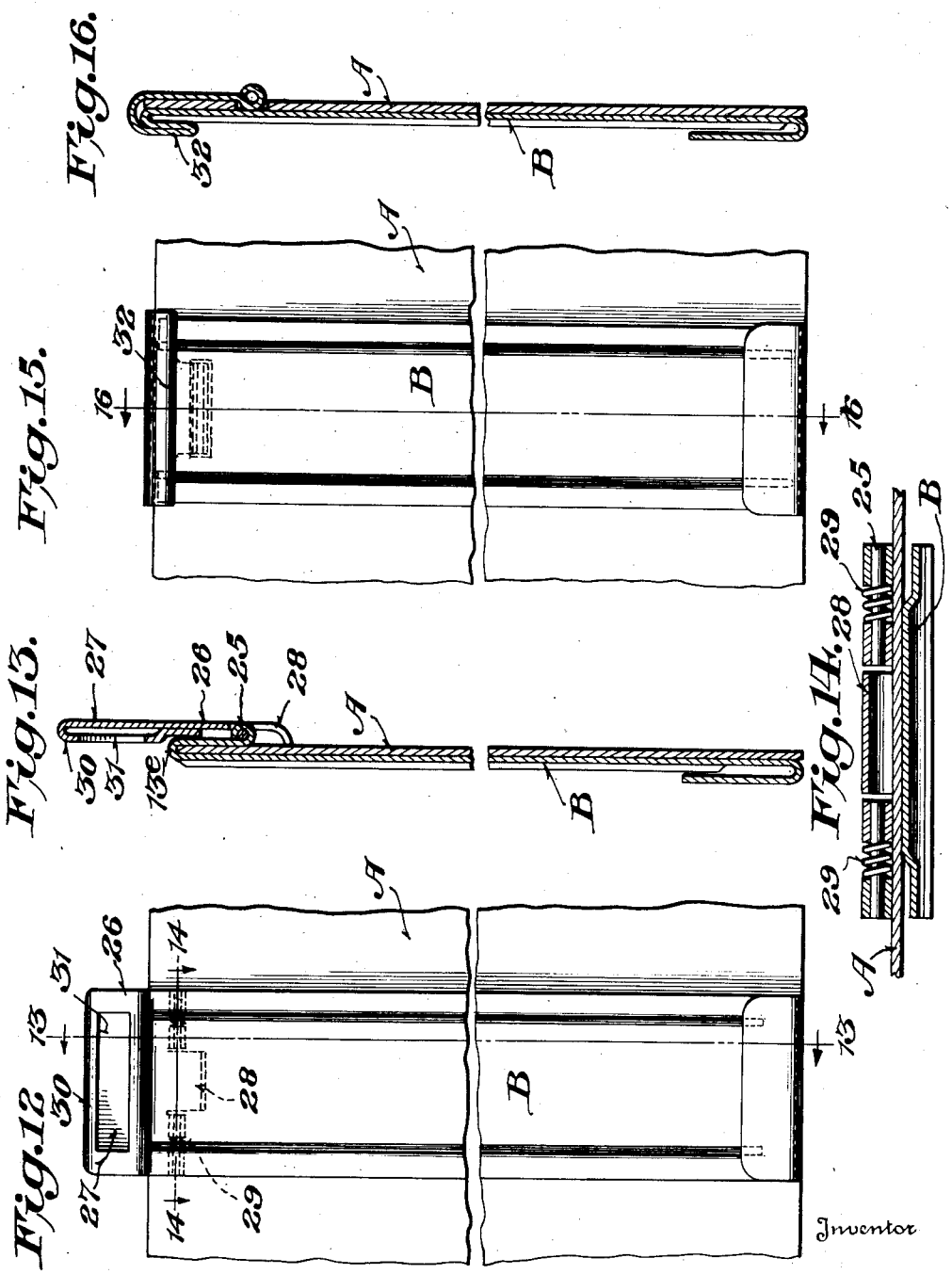

Sept. 21, 1937.  F. L. G. STRAUBEL  2,093,941
CARD INDEX PANEL AND CARD CARRIER COMBINATION
Filed Sept. 1, 1936   5 Sheets-Sheet 4
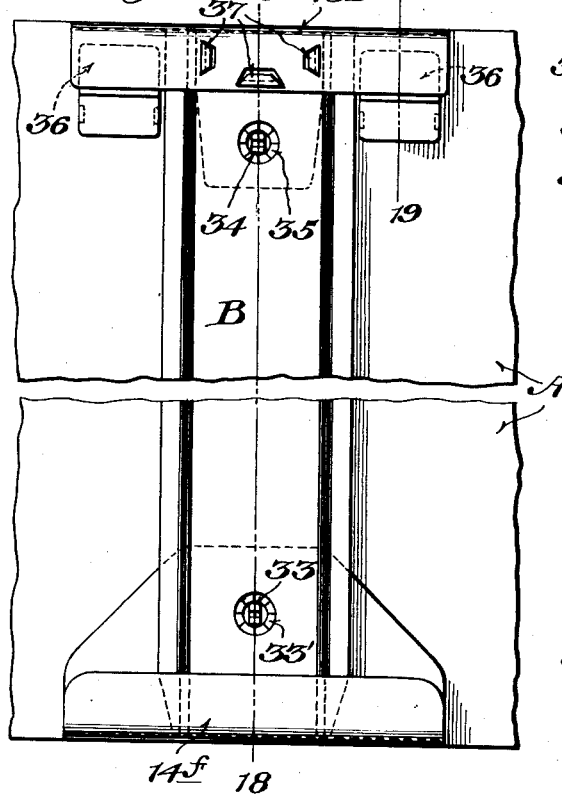
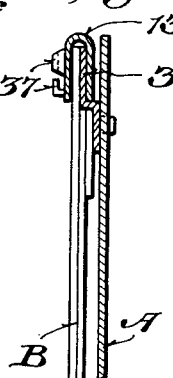
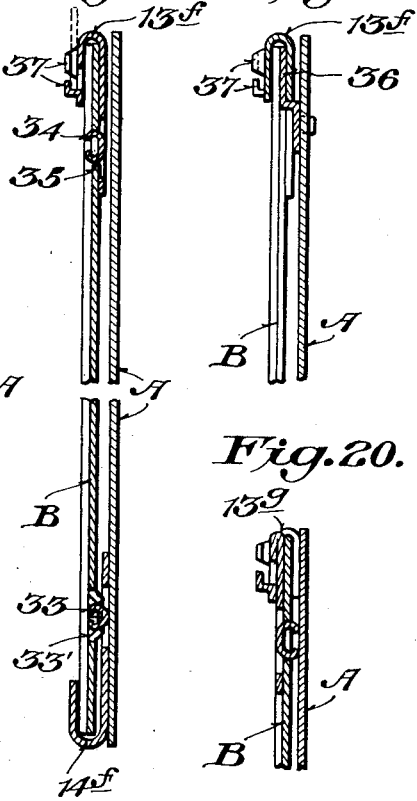
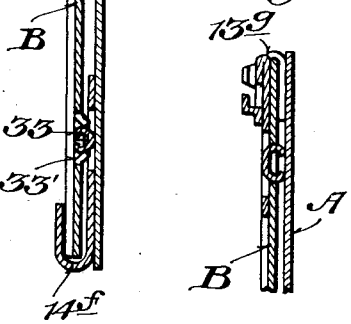
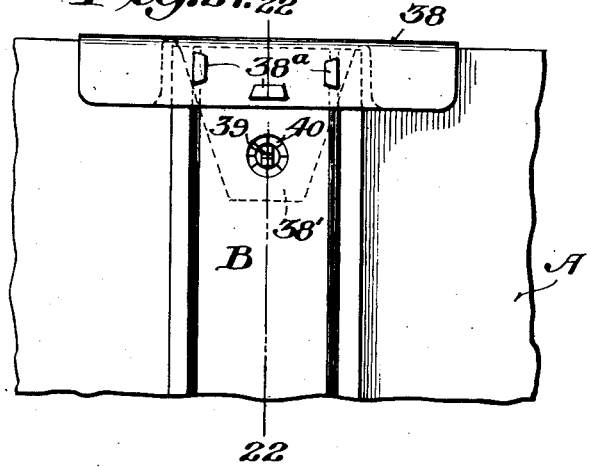
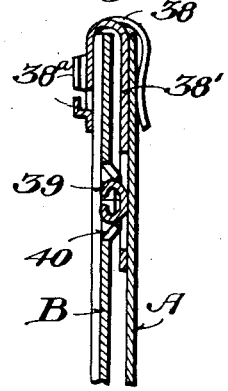
Inventor
Frederick L. G. Straubel,
By D. P. Wolhaupter
Attorney Sept. 21, 1937.   F. L. G. STRAUBEL   2,093,941
CARD INDEX PANEL AND CARD CARRIER COMBINATION
Filed Sept. 1, 1936   5 Sheets-Sheet 5
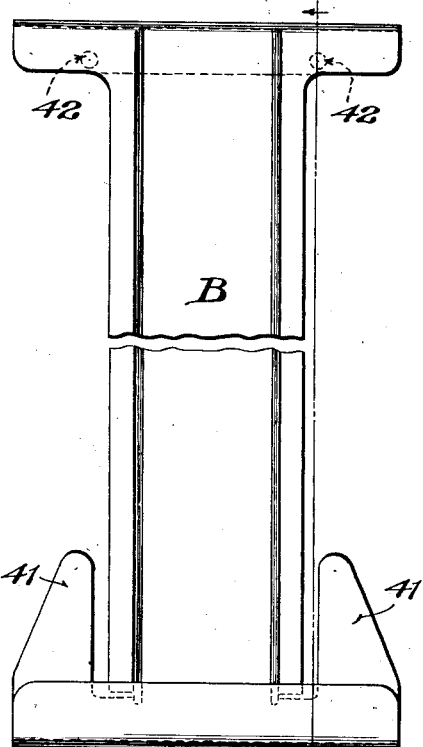
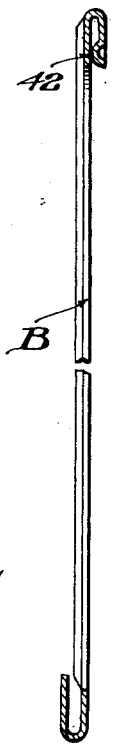
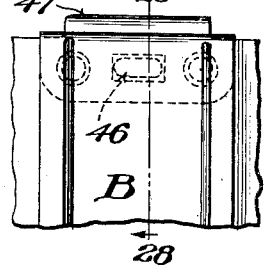
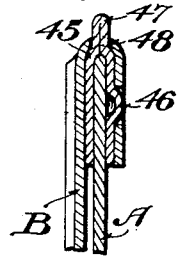
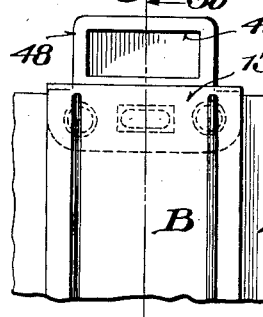
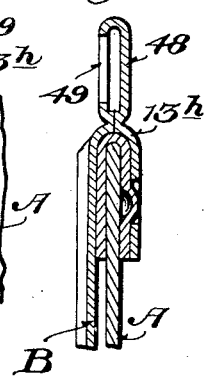
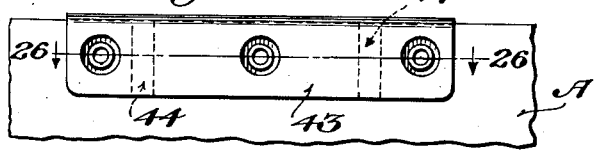
Inventor
Frederick L. G. Straubel,
By
Attorney Patented Sept. 21, 1937

2,093,941

UNITED STATES PATENT OFFICE 2,093,941

CARD INDEX PANEL AND CARD CARRIER COMBINATION

Frederick L. G. Straubel, Green Bay, Wis., assignor of one-eighth to O. C. Straubel, Green Bay, Wis., and two-eighths to C. W. Straubel, Youngstown, Ohio Application September 1, 1936, Serial No. 98,988

13 Claims. (Cl. 129—16)

This invention relates to card index panels such as are used in filing cabinet drawers, in books, on stands and the like for the filing of index cards in visible, alphabetical or other order, and has particular reference to improvements in card index panels having card carrier elements on which the index cards are slidably, removably supported and which are detachably connected with the panels to facilitate rearrangement of the cards or expansion or contraction of a card index system.

One object of the invention is to provide a very simple, practical means of detachably mounting a card carrier on a guide card of the type set forth in Patent No. 2,010,740, dated August 6, 1935, or any similar card or panel which ordinarily divides the filing space into proper sub-divisions. The roll bearing type of guide card in the patent referred to particularly lends itself to the support of detachable card carriers because of the predetermined spacing of the cards afforded by the abutting side portions of the particular types of bottom keys employed.

Another object of the invention is to provide a very simple, practical means of holding a card carrier against accidental disengagement from a panel when a means in accordance with the present invention is employed to detachably mount the card carrier on a panel.

A further object of the invention is to provide the lower end of a card carrier with a lip to retain cards on the carrier, and to detachably connect such lip with the card carrier so that it may be removed to facilitate application and removal of cards to and from the card carrier.

A still further object of the invention is to provide a card carrier with novel means to detachably receive and hold a label indicative of the character of the cards carried by the carrier.

With the foregoing and other objects in view, which will become more fully apparent as the nature of the invention is better understood, the same consists in the novel features of construction, combination and arrangement of parts as will be hereinafter more fully described, illustrated in the accompanying drawings and defined in the appended claims.

In the drawings, wherein like characters of reference denote corresponding parts in related views:

Fig. 1 is a front elevation of a portion of a guide card or card index panel showing the application thereto of a card carrier in accordance with one practical embodiment of the present invention.

Fig. 2 is a vertical section on the line 2—2 of Fig. 1.

Fig. 3 is a cross section on the line 3—3 of Fig. 1.

Fig. 4 is a view similar to Fig. 1 illustrating an alternative embodiment of the invention.

Fig. 4a is a detail perspective view of a label holder for use with the card carrier shown in Fig. 4.

Fig. 5 is a vertical section on the line 5—5 of Fig. 4, with the label holder in place.

Fig. 6 is a fragmentary front elevation of a portion of a guide card or panel and a card carrier illustrating an alternative means of detachably connecting the card carrier with the card panel.

Fig. 7 is a section on the line 7—7 of Fig. 6.

Fig. 8 is a view similar to Figs. 1 and 4 illustrating another alternative embodiment of the invention.

Fig. 9 is a vertical section on the line 9—9 of Fig. 8.

Fig. 10 is a view similar to Fig. 9 illustrating a construction alternative to the construction illustrated in Fig. 9.

Fig. 11 is a front elevation of one of the present card carriers and illustrating the manner of engaging same with and from a series of index cards.

Fig. 12 is a view similar to Figs. 1, 4, and 8 illustrating another alternative embodiment of the invention.

Fig. 13 is a vertical section on the line 13—13 of Fig. 12.

Fig. 14 is a cross section on the line 14—14 of Fig. 12.

Fig. 15 is a view similar to Figs. 1, 4, 8, and 12 illustrating another alternative embodiment of the invention.

Fig. 16 is a vertical section on the line 16—16 of Fig. 15.

Fig. 17 is a view similar to Figs. 1, 4, 8, 12, and 15 illustrating another alternative embodiment of the invention.

Fig. 18 is a vertical section on the line 18—18 of Fig. 17.

Fig. 19 is a vertical section on the line 19—19 of Fig. 17.

Fig. 20 is a view similar to Fig. 18 illustrating a construction slightly alternative to the construction illustrated in Fig. 18.

Fig. 21 is a view similar to Figs. 1, 4, 8, 12, 15, and 17 illustrating another alternative embodiment of the invention.

Fig. 22 is a vertical section on the line 22—22 of Fig. 21.

Fig. 23 is a front elevation illustrating a card carrier of alternative form.

Fig. 24 is a vertical section on the line 24—24 of Fig. 23.

Fig. 25 is a front elevation of the top portion of a card panel equipped with a wear plate for cooperation with a card carrier as illustrated in Fig. 23.

Fig. 26 is a section on the line 26—26 of Fig. 25.

Fig. 27 is a fragmentary front elevation illustrating a form of the invention slightly alternative to the form of the invention illustrated in Figs. 23 to 26.

Fig. 28 is a section on the line 28—28 of Fig. 27.

Fig. 29 is a view similar to Fig. 27 illustrating another slightly alternative form of the invention; and Fig. 30 is a section on the line 30—30 of Fig. 29.

For the sake of simplifying the description of the various different forms of the present invention, the reference character A is employed in each instance to designate a card panel and the reference character B is employed in each instance to designate an associated card carrier. The card panel A in each instance is in the form of a sheet of any suitable material and is suitably formed, or provided with suitable means, whereby it may be operatively mounted within a filing cabinet drawer, or in a book or upon a stand. It may have any desired dimensions to accommodate one or more of the card carriers B each carrying a row of index cards designated as C. Similarly, the card carrier B in each instance may be formed from any suitable sheet material and is of narrow, elongated form having its side marginal portions 10, 10 forwardly offset relative to its medial portion 11 to provide a pair of flanges behind which are engageable tongues 12 struck from the index cards C to attach the cards to the carrier in a manner well known in the art and, therefore, not requiring any further explanation.

According to the embodiment of the invention illustrated in Figs. 1 and 2, the card carrier B is provided at its upper end with what may be termed a head formation, designated as 13, which is of greater width than the main body portion of the card carrier and which is bent rearwardly and downwardly upon itself to provide a relatively wide hook formation for engagement over the upper edge portion of the card panel A, thereby to suspend the card carrier from the upper edge portion of the card panel and to support the card carrier against lateral swinging movement relative to the card panel. At its bottom, the card carrier is provided with a widened foot formation, designated as 14, which is bent forwardly and upwardly upon itself to provide a relatively wide hook formation to accommodate the bottom portion of the lowermost card of a row of index cards C engaged with the card carrier to hold the cards against sliding off the lower end of the card carrier and also to support the cards against tilting relative to the card carrier.

To hold the card carrier B against upward movement relative to the card panel A when said card carrier is operatively engaged with said card panel, the rearwardly disposed, downwardly extending portion of the head formation 13 is suitably provided with a spring tongue 15 having a portion 16 thereof bent forwardly to snap into a hole 17 in the card panel A when the card carrier is operatively engaged with the panel. There may be a row of the holes 17 across the card panel A, so that the card carrier may be operatively engaged with said card panel at different locations laterally of said card panel. Moreover, the medial portion 11 of the card carrier may have a hole 18 aligned with the forwardly directed portion or protuberance from the hole 17 when it is desired to remove the card carrier from the card panel.

Figs. 4 and 5 of the drawings illustrate that it is not essential to have the hook formations 13' and 14' at the top and the bottom of the card carrier B any wider than said card carrier and that it is not essential to provide the medial portion 11' of the card carrier with a hole aligned with the protuberance 16' of the spring tongue 15', since obviously, said protuberance is disengageable from the hole 17' in the card panel simply by forcing the card carrier upwardly relative to the card panel. In fact, as suggested by Figs. 8 and 9 of the drawings, even the holes 17' may be eliminated and the frictional engagement between the tongue 15' and the rear face of the card panel may be relied upon to retain the card carrier on the card panel, in which event the card carrier obviously may be operatively engaged with the card panel at any desired location transversely of the panel. According to Figs. 4 and 5 the top portion of the card carrier B has tongues 11a struck forwardly therefrom to provide retaining means for a label holder H as shown in Fig. 4a, the said label holder having a label receiving formation h and a depending flange h' to be removably engaged with the tongues 11a.

Figs. 6 and 7 of the drawings illustrate that a relatively wide part of the rearwardly disposed, downwardly directed portion of the head 13a of the card carrier may be employed as a spring tongue for cooperation with the card panel to hold the card carrier against accidental upward movement from an applied position on the card panel. The said relatively wide part of said portion of said head is rolled into the form of a bead 16a to snap into a horizontally elongated hole 17a in the card panel. The hole 17a is of substantially the same length and width as the bead 16a. Therefore, when said bead is engaged in said hole the end edges and the top and the bottom faces of the bead engage with the edges defining the ends and the top and the bottom of the hole 17a, respectively, and thereby assist in holding the card carrier against endwise and pivotal movements as well as against upward movement relative to the panel. Moreover, the hole 17a is spaced downwardly from the top edge of the panel by an amount corresponding to the spacing of the bead 16a from the top of the head or hook formation 13a. Therefore, when the hook formation 13a is engaged over the upper edge portion of the panel A and the bead 16a is engaged in the hole 17a, the top or bight portion of the hook formation is seated against the top edge of the panel and is held seated thereagainst by the cooperation of said bead 16a with the hole 17a. Thus, the card carrier additionally is held against swinging movement from its operative, vertically disposed position relative to the panel.

Figs. 8 and 9 of the drawings illustrate that the bottom hook formation 14c of the card carrier may be formed as an element separate from and detachably connected with said card carrier. The said hook formation includes a back portion 19 disposed against the back of the medial portion 11c of the card carrier and having a hole 20 therein in which is engaged a protuberance 21 on a spring tongue 22 struck from the said medial portion 11c of the card carrier, the said spring tongue 22 acting to urge the back portion 19 forwardly against the back of the medial portion 11c of the card carrier, thereby to hold the hook formation 14c properly positioned relative to the card carrier, and the protuberance 21 on said spring tongue cooperating with the hole 20 to hold the hook formation against sidewise and endwise movement relative to the card carrier. As shown, the lower end portion of the card carrier extends through a slot in the bottom of the hook formation whereby the hook formation additionally is effectively held against forward, rearward, or sidewise movement relative to the card carrier.

As an alternative of the construction illustrated in Figs. 8 and 9, Fig. 10 illustrates that the back portion of the hook formation 14d may have a spring tongue 23 struck therefrom for cooperation with a cross bar formation 24 of the card carrier to detachably secure said hook formation on said card carrier.

Fig. 11 illustrates that when the bottom card supporting hook formation of the card carrier is removed from said card carrier, it is a very simple matter to engage the card carrier with a row of cards C, or to disengage the card carrier from a row of cards, simply by endwise movement of the card carrier relative to the cards in a manner which is apparent. In this connection it will be noted that the side edges of the card carrier flanges 10, 10 are inclined inwardly at the bottom of the card carrier whereby insertion of said flanges into the spaces between the tongues 12 and the body portions of the cards C is facilitated.

In Figs. 12 to 14 is illustrated a spring clip device for detachably fastening the card carrier on the card panel. The upper end portion of the card carrier is bent rearwardly and downwardly upon itself to provide a hook formation 13e for engagement with the upper edge portion of the card panel, and to the rearwardly disposed portion of said hook formation is suitably hinged, as at 25, a member 26 having a top portion 27 extending above the top of the card carrier for finger engagement and having a bottom portion 28 disposed below the hinge 25 for frictional contact with the back of the card panel. Suitable spring means comprising, for example, a pair of coil springs 29 on the hinge pintle of the member 26 and engaged at their ends with said member and the rear portion of the hook formation, respectively, tend constantly to rotate said member in a direction to urge its bottom portion forwardly. Accordingly, by exerting forward finger pressure upon the top portion 27 of said member 26 to swing its bottom portion 28 rearwardly, the hook formation 13e is readily engageable with the upper marginal portion of the card panel, and by then releasing the pressure on the top portion of said member, the springs 29 act to urge the bottom portion 28 of the member into engagement with the rear face of the card panel to hold the card carrier operatively positioned on said card panel. Similarly, when the card carrier is applied to the card panel the holding member 26 is readily released to permit detachment of the card carrier from the panel, simply by exerting forward pressure upon the top portion 27 of said holding member.

If desired, the top portion 27 of the holding member 26 may be bent forwardly upon itself, as indicated at 30, to provide a holder for a label indicative of the character of the index cards carried by the related card carrier, the portion 30 having a suitable opening 31 through which a label disposed in said holder is visible.

Figs. 15 and 16 illustrate a construction which is similar in all respects to the construction illustrated in Figs. 6 and 7, except that the top portion of the card carrier first is bent forwardly and downwardly upon itself, as indicated at 32, prior to being bent rearwardly and downwardly, thereby to provide a downwardly facing shoulder or finger grip formation at the front of the card carrier to facilitate lifting of the card carrier off of the card panel.

Figs. 17 to 19 illustrate that both the upper and the lower hook formations 13f and 14f, respectively, may be comprised by elements separate from the card carrier detachably fastened to said card carrier by snap fasteners. The bottom hook formation 14f, otherwise similar to the bottom hook formation shown in Figs. 8 and 9, is suitably provided with a male snap fastener element 33 for cooperation with a female snap fastener element 33' suitably provided on the medial portion of the card carrier. Similarly, the top hook formation 13f, of inverted U-shape in cross section, has its rear portion disposed against the back of the medial portion of the card carrier and provided with a forwardly directed male snap fastener element 34 engageable in a female snap fastener element 35 in the form of a plurality of resilient fingers surrounding a hole in the medial portion of the card carrier. The hook formation 13f extends beyond the sides of the card carrier so that its rear wall, beyond the sides of the card carrier, is engageable behind a pair of clips 36, 36 suitably fastened against the front face of the card panel to detachably mount the card carrier on said card panel. If desired, hook-like tongues 37 may be struck outwardly from the front wall of the hook formation to provide a label holder.

Fig. 20 simply illustrates, as distinguished from the construction illustrated in Figs. 17 to 19, that the medial portion of the rear wall of the top hook member 13g may be disposed against the front of the medial portion of the card carrier in the channel formed by forwardly offsetting the side flanges of said card carrier.

Figs. 21 and 22 illustrate that a resilient, spring-like plate 38 of inverted U-shape in cross section may be engaged over the upper edge portion of the card panel and the card carrier; that said plate may have its medial portion bent downwardly in the form of a tongue 38' to lie against the front of the card panel for cooperation with the portions of said plate which lie against the rear of the card panel to retain said plate on said card panel; that the said tongue 38' may carry a male snap fastener element 39, and that the card carrier may be devoid of a hook formation at its top and in lieu of a top hook formation may be provided with a female snap fastener formation 40 for cooperation with the male snap fastener element 39 to detachably connect the card carrier to the card panel. Moreover, said figures illustrate that the front portion of the plate 38 which overlies the card carrier B may have tongues 38a to retain thereon a label holder of the type shown in Fig. 4a, or of any other suitable type.

Figs. 23 to 26 of the drawings illustrate that the bottom hook formation of the card carrier may have rear wall portions 41, outwardly of the sides of the card carrier, extended upwardly to assist in supporting index cards carried by said card carrier; that the top hook formation of the card carrier my have protuberances 42 pressed forwardly from the rear wall thereof; that a wear plate 43 of inverted U-shape in cross section may be engaged over the upper marginal portion of the card panel; that rivets or other suitable fasteners may be employed to secure said wear plate to said card panel, and that the rear wall of said wear plate may have depressions 44 formed therein to accommodate the protuberances 42 to frictionally retain the card carrier on the card panel.

Figs. 27 and 28 illustrate that the card panel may be provided at its top with a wear plate 45 of inverted U-shape in cross section; that the rear wall of said wear plate may have a protuberance 46 to engage in an opening in the rear wall of the hook formation of the card carrier to frictionally retain the card carrier on the card panel, and that the wear plate may have an upward extension 47 to pass through an opening 48 in the top of the hook formation of the card carrier when the latter is operatively mounted on the card panel.

Figs. 29 and 30 illustrate that the top hook formation 13h of the card carrier may be bent upon itself at its top to provide a label holder 48 having front and rear walls, of which the front wall may be provided with an opening 49 so that a label disposed within said holder is clearly visible.

Obviously any of the bottom card carrier constructions may be used with any of the top card carrier constructions.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. In combination, a card panel, a card carrier having a hook formation at its top to be engaged over the upper edge portion of the card panel to detachably suspend the card carrier from the card panel, said hook formation extending beyond the side edges of the card carrier for engagement with an extensive portion of the upper edge of the card panel to hold the card carrier against tilting movements in its plane relative to the card panel, and a spring tongue integral with said hook formation for cooperation with said panel to hold the card carrier against upward movement relative to the panel.

2. In combination, a card panel, a card carrier having a hook formation at its top for engagement over the upper edge portion of the panel to suspend the card carrier from the card panel, and means carried by the hook formation and spring urged into engagement with the card panel to releasably hold the card carrier against upward movement relative to the card panel.

3. In combination, a panel, and a card carrier having at the top thereof a hook formation to be engaged over the upper edge portion of the panel to detachably suspend the card carrier from the panel, said hook formation having a part thereof formed for cooperation with the panel to hold the card carrier against upward movement relative to the panel.

4. In combination, a panel, a card carrier having a hook formation at its top for engagement over the upper edge portion of the panel to suspend the card carrier from the panel, and interengageable means on said hook formation and the panel to releasably hold the card carrier against upward movement relative to the panel.

5. In combination, a card panel adapted for use in the filing space of a file drawer and having an opening, and a card carrier having a hook formation at the top thereof to fit over the upper edge portion of the card panel to suspend the carrier from the panel, said hook formation having a spring tongue releasably fitting in said opening to interlock the carrier with the card panel to prevent accidental displacement of the carrier relative to the panel.

6. In combination, a card panel adapted for use in the filing space of a file drawer and having an opening, and a card carrier having a hook formation at the top thereof to be engaged over the upper edge portion of the card panel to suspend the card carrier from the panel, said hook formation having spring means engageable in said opening and cooperating with the edges defining the same to interlock the carrier with the card panel.

7. In combination, a card panel adapted for use in the filing space of a file drawer and having a rectangular opening, and a card carrier including a hook formation at the top thereof to be engaged over the upper edge portion of the card panel to suspend the carrier from the panel, said hook formation having a resilient rectangular portion to fit neatly in said opening to interlock the carrier with the card panel.

8. In combination, a card panel adapted for use in the filing space of a file drawer and having a rectangular opening, and a card carrier including a hook formation at the top thereof embracing the upper edge portion of the card panel and said hook having a spring tongue having side edge portions for engaging with the sides of the rectangular opening to prevent sidewise movement of the card carrier relative to the panel.

9. In combination, a card panel adapted for use in the filing space of a file drawer and having an opening spaced downwardly from its top edge, a card carrier having an opening to register with the opening in the card panel and also having a rearwardly and downwardly extending hook to engage over the upper edge portion of the panel, said hook having an offset portion to fit into the openings respectively in the card panel and card carrier when the said openings are in registry thereby to hold the carrier and panel interlocked and to expose the said offset portion at the front side of the card carrier for finger engagement to release the carrier from the panel.

10. In combination, a card panel, a card carrier having at the top thereof a hook formation for engagement over the upper edge portion of the panel to suspend the carrier from the panel, and means carried by said hook formation for cooperation with the panel to hold the carrier against upward movement relative to the panel.

11. In combination, a card panel having an opening, a card carrier having an opening, means for suspending said carrier from said panel with said openings alined, and means on said carrier engageable in said alined openings to releasably interlock the carrier with the panel.

12. A card carrier comprising a strip having opposite edge portions for slidably receiving index cards, said strip having hook means at one end to hang the carrier on a support, and said hook means being resilient to clampingly embrace the support and to retain the carrier releasably thereon.

13. A card carrier comprising a strip having opposite side edge portions formed to have index cards slidably mounted thereon, hook means on an end of said strip for mounting the strip on a support, and means carried by said hook means for clamping engagement with the support to retain the strip releasably mounted thereon.

FREDERICK L. G. STRAUBEL.